United States Patent [19]

Pitot

[11] Patent Number: 5,428,650
[45] Date of Patent: * Jun. 27, 1995

[54] METHOD AND DEVICE FOR SELECTING INFORMATION USABLE BY A LOCAL UNIT CONNECTED TO A DIGITAL TRANSMISSION SYSTEM

[75] Inventor: Christian Pitot, Boulogne, France

[73] Assignee: Sextant Avionique, Meudon La Foret, France

[*] Notice: The portion of the term of this patent subsequent to Dec. 20, 2011 has been disclaimed.

[21] Appl. No.: 872,382

[22] Filed: Apr. 23, 1992

[30] Foreign Application Priority Data

May 7, 1991 [FR] France ................................. 91-05565

[51] Int. Cl.⁶ .......................................... H04L 23/00
[52] U.S. Cl. .................................... 375/377; 375/219; 395/275
[58] Field of Search .................. 375/38, 121, 7; 395/275

[56] References Cited

U.S. PATENT DOCUMENTS 4,455,929 7/1988 Outous et al. ....................... 395/275
4,493,021 1/1985 Agrawal ............................. 364/200

FOREIGN PATENT DOCUMENTS 0255767 7/1987 European Pat. Off. .

OTHER PUBLICATIONS

Chun, Randall K., "ARNIC 429 Digital Data Communications for Commercial Aircraft", *Journal of Guidance, Control and Dynamics*, vol. 6, No. 2, pp. 120–123, Mar.–Apr. 1983.
Aho, Alfred V., Hopcroft, John E. and Ullman Jeffrey D., *Data Structures and Algorithims*, Addison-Wesley Publishing Co., Mass., Jun. 1983.

*Primary Examiner*—Stephen Chin
*Assistant Examiner*—T. Ghebretinsae
*Attorney, Agent, or Firm*—Browdy and Neimark

[57] ABSTRACT

A method of selecting information usable by a local unit connected to a digital transmission system includes cyclical scanning at fixed frequency of a list of programmed conditions stored in memory, acquisition of information on the transmission channels and activation of a selection process each time that the selection information of a message has been acquired. The selection process comprises a synchronization stage which waits for the scanning process to cross the start of the list of conditions. In a comparison sequence the selection information is compared with the conditions of the list. A selection variable is produced indicating if the message being received is of interest to the local unit or not. The method may be implemented through the use of a highly integrated interface.

10 Claims, 1 Drawing Sheet

METHOD AND DEVICE FOR SELECTING INFORMATION USABLE BY A LOCAL UNIT CONNECTED TO A DIGITAL TRANSMISSION SYSTEM

BACKGROUND OF THE INVENTION

Field of the Invention

The present invention is generally concerned with a method and device for selecting information usable by a local unit connected to a digital transmission system, in which the selection criterion is part of the message transmitted and is located at the start of the message.

It applies, for example, to the sorting of digital information received sequentially over one or more independent transmission lines and organized in time in such a way that the information needed for selection purposes is known before the information proper so that sorting can be carried out before the end of transmission of the current message on the channel in question.

The invention is more particularly, although not exclusively, directed to a device of this kind implemented in the form of a highly integrated interface unit between a processor and one or more serial transmission lines conveying information in the form of a succession of words each representing a predetermined frame, in accordance with the aeronautical standard ARINC 429, for example.

According to this standard, each 32-bit word comprises in succession:
a first number on eight bits (bits 0 through 7) defining a label;
a second number (SDI) on two bits (bits 8 and 9) identifying the source or the destination of the word;
a third number on 21 bits (bits 10 through 30) containing the transmitted data; and
a parity bit (bit 31).

The standard naturally imposes a number of conditions (called "templates"), in particular with regard to:
the maximum and minimum times associated with the transmission of an information bit;
the duty factor of the modulation signal;
the time interval or "Gap" between two words;
the number of bits per word (32 in this instance); and
the parity of the words.

In this type of application the invention proposes to carry out before each word is transmitted sorting relating not only to the conformity of the word to the previously listed templates but also to the pertinence of this word for the processor, without using any external personalizing memories.

SUMMARY OF THE INVENTION

In one aspect, the present invention consists in a method of selecting digital information to be transmitted to a local unit originating from one or more independent transmission lines and in the form of messages sent sequentially and organized in such a way as to comprise the wanted information preceded in time by selection information, the method including the following steps:
cyclical scanning at a fixed frequency of a programmed list of conditions in memory;
simultaneous acquisition of information on said channels;
activation of a selection process each time that the selection information of a message received on either channel has been acquired, the selection process including a synchronization stage which waits for the scanning process to cross the start of the list of conditions, a comparison (pattern matching) sequence on the selection information contained in the message being received, and the production of a selection variable which indicates if the message being received is of interest to the local unit or not, the selection process ending either when all the conditions from the list have been exhausted and on returning to the start of list condition or upon reading a special end of list code;
the memorization of messages selected in a buffer accessible to the local unit.

Each condition is advantageously a selection binary word comprising at least as many bits as the selection information contained in the messages, the comparison being carried out bit by bit.

The selection words advantageously comprise additional bits representing processing to be applied to the message.

Also, the selection words may comprise masks.

In this case the selection information contained in a message will be regarded as coinciding with a selection word from the list of conditions if the information and the word differ only in respect of bits for which a mask has been defined.

In a second aspect, the invention consists in a device for selecting digital information to be transmitted to a local unit originating from one or more independent transmission lines and in the form of messages sent sequentially and organized in such a way as to comprise the wanted information preceded in time by selection information, which device comprises, connected by an internal bus:
a receive unit connected to at least one transmission line by a demodulator and comprising a buffer;
an interface to the local unit;
a first random access memory associated with a data management circuit;
a pattern matching message recognition device looking for coincidence between the selection criteria of the words being received on both channels and the label trap code bits stored in an area of a second random access memory, the codes being presented sequentially by a label trap pointer;
a control unit driving an address generator associated with the second random access memory through a receive pointer, a send pointer and a condition list pointer.

The device may be in the form of a highly integrated input/output interface unit between a microprocessor-based local unit and one or more serial transmission lines conveying information conforming to the ARINC 429 standard and comprising 32-bit words representing the frame as previously described, 16-bit words being transferred between this interface and the local unit.

One embodiment of the invention will now be described by way of non-limiting example with reference to the appended drawings.

DETAILED DESCRIPTION OF THE INVENTION

Figure 1:
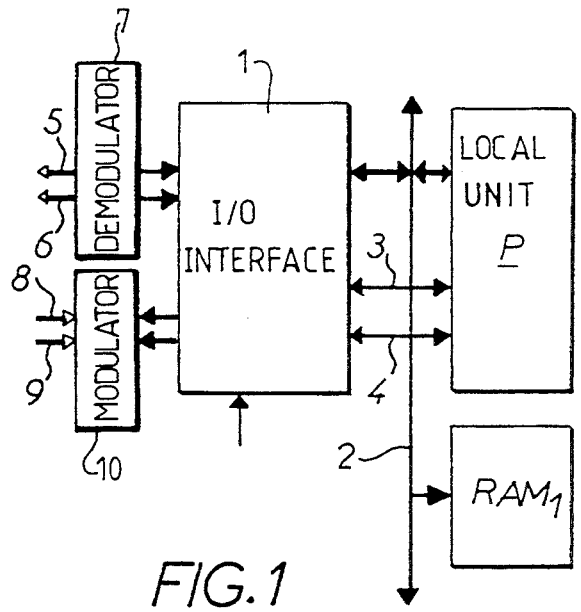
FIG. 1 is a block diagram showing an interface in accordance with the invention connected between a processor and two pairs of transmission channels (two send channels and two receive channels).
Figure 2:
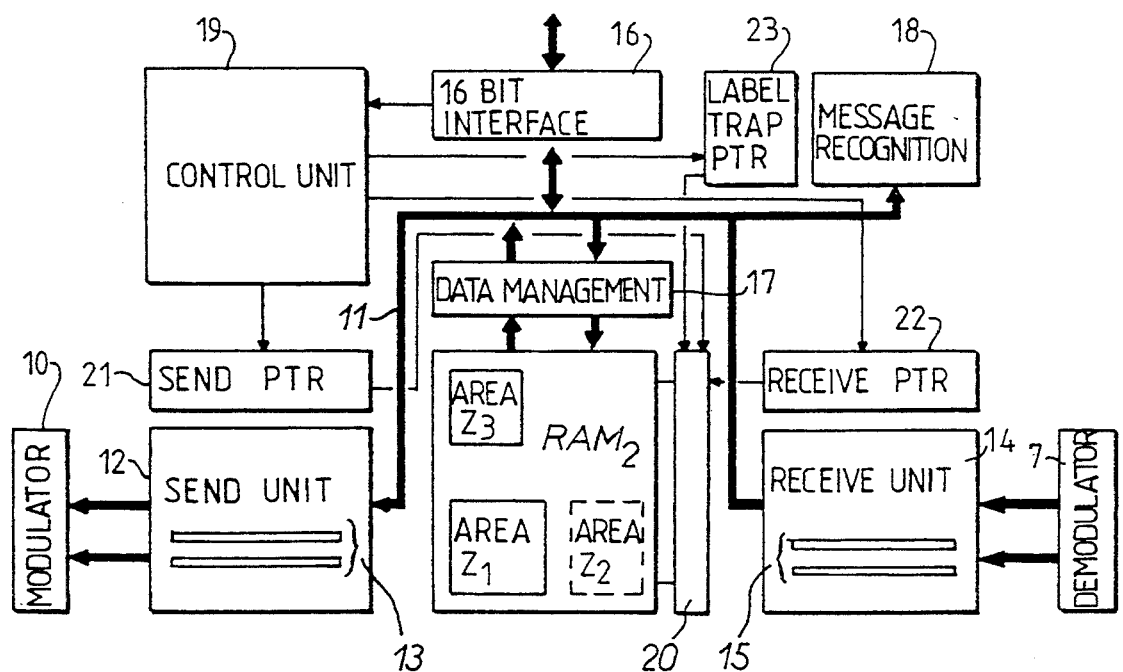
FIG. 2 is a block diagram of the interface shown in FIG. 1.

In the example shown in FIG. 1, an input/output interface 1 in accordance with the invention is connected to a microprocessor-based local unit P connected to a random access memory $RAM_1$ by a data bus 2, a control bus 3 and an address bus 4 and connected to two channels 5, 6 for receiving information conforming to the ARINC 429 standard via a demodulator 7 and to two channels 8, 9 for sending information conforming to the ARINC 429 standard through a line modulator 10.

The input/output interface 1 comprises, interconnected by an internal bus 11:

a send unit 12 connected to the modulator 10 and using a buffer comprising two 16-bit registers 13 to store the half-word being sent on each channel; the buffer may be an extension of a memory area $Z_1$ described later in which the words are organized in queues;

a receive unit 14 connected to the demodulator 7 and using a buffer comprising two 16-bit registers 15 to accumulate the bits of ARINC half-words received on each of the two channels before they are transferred into a memory area $Z_2$ described later;

a 16-bit interface 16 connected to the microprocessor-based local unit P;

a random access memory $RAM_2$ associated with a data management circuit 17 and which may be an extension of the two buffers 13, 15;

a pattern matching message recognition device 18 looking for coincidence between the selection criteria of words being received on the two channels and label trap codes stored in an area $Z_3$ of the random access memory $RAM_2$, these codes being presented sequentially to the message recognition device by a label trap pointer 23; and a control unit 19 driving an address generator 20 associated with the random access memory $RAM_2$ through a send pointer 21, a receive pointer 22 and the label trap pointer 23.

ARINC words can be sent over the two channels 8, 9 at programmable frequencies of 12.5, 100 and 1000 kHz, for example.

The words to be sent are formatted and loaded by the processor P into a memory (for example, an area of the random access memory $RAM_2$). Parity and template generation, transmit sequencing and parallel-to-serial conversion are carried out internally for each channel.

The ARINC words to be sent, with the SDI bits added to them, are supplied by the processor P and stored in the memory area $Z_1$ of the random access memory $RAM_2$ before parallel-to-serial conversion.

The memory area $Z_1$ is managed like an FIFO stack using dynamic allocation in order to optimize its occupancy according to the speed programmed for each of the two channels 8, 9. Its capacity is 32 ARINC words for the combination of the two channels.

The loading of an ARINC word (32 bits) into the memory area $Z_1$ is initiated by the local unit and is carried out in two stages: transfer of the 16 least significant bits followed by the 16 most significant bits. The parallel-to-serial conversion of an ARINC word on a required channel 8, 9 can only proceed when:

its half-words have been loaded by the local unit (processor P) into the memory area $Z_1$;

all words previously sent to this channel have been sent in full.

The 32nd bit of the ARINC word which defines the parity of the word is calculated internally.

The transmission frequency is defined by a programming word sent by the local unit (processor P).

Transmission starts on one channel immediately a complete word has been loaded into a pair of 16-bit words with consecutive addresses allocated in area $Z_1$ to the channel in question by the dynamic allocator device included in the send pointer 21.

ARINC words are received over channels 5, 6 in the following manner:

Each word received having passed the checks requested in a programming word and having selection information (in this instance, the combination label-SDI-channel) identified by the message recognition device is loaded into memory after substituting for its 32nd bit (parity bit) the number of the channel on which it was received. It is loaded into the area $Z_2$ of the random access memory $RAM_2$ managed as an FIFO stack with a capacity of 64 ARINC words.

The full restoral of an ARINC word stored in this way is initiated by the processor P and requires two consecutive read phases, namely:

a phase in which the 16 least significant bits are read;

a phase in which the 16 most significant bits are read.

When the memory area $Z_2$ is empty the two read operations initiated by the local unit restore a special code, for example the code 0000 h.

As already mentioned, before it can be transferred into the memory area $Z_2$ the word currently being received is subject to a number of checks of a kind which can be programmed in the programming word.

The problems which can cause the word to be rejected include, for example:

non-standard duty factor (its value is outside a predetermined range of values);

inconsistent speed (not all bits are received at the same speed);

non-standard speed;

gap error (the duration of the time interval preceding the start of the next word is less than a predetermined value);

simultaneous reception of a high logic state on the H and L pins of the same ARINC channel;

parity error (for example, the parity of a word is not odd after its 32 bits are received).

The device for recognizing the selection information contained in the messages has two separate functions:

1) It selects the ARINC words to be received in the memory area $Z_2$ (using the information contained in the respective label-SDI-channel combination).

2) It sends interrupts to the local unit (processor P) if ARINC words are received containing "special" label-SDI-channel combinations.

These two functions are carried out by sequentially comparing the label-SDI-channel combination of each new word received with all the codes stored in an internal table called the label trap.

This table is physically implemented by an area $Z_3$ of the random access memory $RAM_2$ which can have a storage capacity of 64 words×16 bits, for example.

It must be preloaded sequentially by the local unit (processor P) before the interface 1 is initialized in the mode then present provided for this purpose.

The process of scanning the codes in the table takes 128 basic clock periods of the circuit, for example, and reads the 64 entries of the list successively. It is activated automatically on receiving the 10th bit of the ARINC word currently being received. The selection process is synchronized when the list pointer passes through the zero address of the list of conditions which synchronizes the selection task and the label trap scanning task.

The label-SDI-channel combination of a word newly received is regarded as identical with one of the label traps programmed by the local unit if the following three conditions are met:
1) The labels received and programmed are identical or differ only in respect of bits for which a mask has been defined.
2) The SDI received and programmed are identical or subject to masking.
3) The channel numbers received and programmed are identical or subject to masking.

The function of the recognition device previously described is to generate a selection variable determining whether the word is retained or rejected.

When the condition list scanning process is synchronized, the selection variable is naturally at zero. Starting from this point, each time a new condition is read from the list and until the list is exhausted (or an end of list word is read), the value of the selection variable is modified in accordance with the rules explained below which depend on the nature of the codes employed.

In this example the local unit can define three different types of code:
bases,
base alterations,
end of list word.

A base is a 16-bit binary word in which:
bits 0 through 7 represent the programmed label which is compared with the received label;
bits 8 and 9 represent the programmed SDI which is compared with the received SDI;
bit 10 represents the programmed channel number which is compared with the received channel number;
bit 11 characterizes the fact that the current code is a base;
bit 12 can be used to mask the SDI comparison;
bit 13 can be used to mask the channel number comparison;
if identity with the current code has been established, bit 14 can be used to cancel the effect of a previously established identity with another code (condition reversal);
bit 15 can be used to identify the label-SDI-channel combination associated with the ARINC word being received as "special" if the current code succeeds in establishing identity.

A base alteration is a 16-bit binary word in which:
bits 0 through 7 which represent the label can be used to mask the comparison between some label bits and the same-position bits in the altered base;
bits 8 through 10 must be forced to 0;
bit 11 characterizes the fact that the current code is a base alteration (the characteristics of the base with which the alteration is associated being retained);
bits 12 through 15 must be forced to 0.

The end of list word is a 16-bit binary word which can be used to specify the end of the label trap table when the latter does not need to be programmed in its entirety.

Codes following this end of list word are therefore prevented from contributing to the analysis of whether the label-SDI-channel combination is identical to the ARINC word being received. Its characteristic value is FF00 h, for example (first eight bits at 1, last eight bits at 0).

The following examples will illustrate more clearly the principle of the programming carried out by the programming codes from the table, whether this concerns a base, a base alteration or an end of list word.

| Example No 1 | | | |
|---|---|---|---|
| 0 0 000 0 01 00001111 | → | Label word recognition | |
| | | | 00001111 |
| | | with the SDI | 01 |
| | | on the channel | 0 |
| 0 0 000 1 10 11110000 | → | and label words | |
| | | | 11110000 |
| | | with the SDI | 10 |
| | | on the channel | 1 |
| 1 1 111 1 11 00000000 | → | End of list | |
| Example No 2 | | | |
| 0 0 110 x xx 10101010 | | | |
| 0 0 001 0 00 00001111 | | | |
| 0 0 001 0 00 10000000 | → | Label word recognition | |
| | | | 1010xxxx |
| | | | & X0101010 |
| | | with the SDI | 00,01,10 & 11 |
| | | on the channels | 0 & 1 |
| 0 1 000 1 11 10101100 | | | |
| 0 0 001 0 00 00001100 | | | |
| 0 0 001 0 00 00000011 | → | except label words | |
| | | | 1010xx00 |
| | | | & 101011xx |
| | | with the SDI | 11 |
| | | on the channel | 1 |
| 1 1 111 1 11 00000000 | → | End of list | |
| Example No 3 | | | |
| 1 0 000 0 00 00000000 | | | |
| 0 0 001 0 00 11111110 | → | Label word recognition | |
| | | | xxxxxxx0 |
| | | with the SDI | 00 |
| | | on the channel | 0 |
| & Sending of an interrupt to the local unit | | | |

| | |
|---|---|
| 1 1 111 1 11 00000000 | → End of list |

Bearing in mind what has been explained above, the value of the selection variable is determined by applying the following rules:
a) If the condition is a base and the channel/SDI/label values which characterize the word being received coincide with the base code:
  If the condition reversal bit has the value 0, the selection variable is set to 1.
  If the condition reversal bit has the value 1, the selection variable is set to 0.
  In other cases the selection variable is unchanged.
b) If the condition is a base alteration and the channel/SDI/label values which characterize the word being received coincide with the code of the previous base received modified in the sense of widening the condition by means of immaterial positions introduced by the current base alteration:
  If the condition reversal bit has the value 0, the selection variable is set to 1.
  If the condition reversal bit has the value 1, the selection variable is set to 0.
c) If the condition is an end of list word:
  The value of the selection variable is the definitive value.

As previously mentioned, the sequence of checks applied to the ARINC words being received is programmed (by the programming word) and produces a 16-bit status word which tells the local unit the state of the interface and the characteristics of the transmissions carried out. In this 16-bit status word:
bits 0 and 1 denote the speed at which the ARINC words are transmitted on the first channel (there are three possible speeds);
bits 2 and 3 denote the speed at which ARINC words are transmitted on the second channel;
bits 4 and 5 define the operating mode:
  00—application,
  01—label trap,
  10—receive RAM test,
  11—send RAM test;
bits 6 through 9 are interrupt enabling bits for use when:
  the send FIFO stack becomes empty (bit 6),
  the receive FIFO stack becomes empty (bit 7),
  the send FIFO stack overflows (bit 8),
  the receive FIFO stack overflows (bit 9).

If a problem for which checking is programmed in the programing word is detected on either of the two channels the status word is updated by adding a flag characterizing the problem.

On a reset all receive checks are disabled (bits 10 through 15), all interrupts requested by the FIFO stacks are disabled (bits 6 through 9), the operating mode is set to "label trap" (bits 4 and 5) and transmission is inhibited on both channels (bits 32 and 10 equal to 0).

Interrupts are managed by an interrupt vector which the local unit reads when it receives an interrupt to determine the reason for the interrupt.

The interrupt vector is a 16-bit word in which:
bits 15 through 9 define the number of ARINC words stored in the receive FIFO stack:

| | |
|---|---|
| 0000000 → 0 word |
| 0000001 → 1 word |

| | |
|---|---|
| 0111111 → 63 words |
| 1000000 → 64 words |
| 1111111 overflow causing an interrupt to be sent; | bits 8 through 3 define the number of ARINC words stored in the send FIFO stack:

| | |
|---|---|
| 0000000 → 0 word |
| 0000001 → 1 word |
| 0111111 → 31 words |
| 1000000 → 32 words |
| 1111111 overflow causing an interrupt to be sent; | bit 2 indicates an interrupt following reception of a word whose label contains a flag;
bit 1 indicates an interrupt following a receive problem on one channel;
bit 0 indicates an interrupt following a receive problem on the other channel.

Communications between the processor of the local unit (called the CPU hereinafter) and the interface conform to a protocol defined by the following programming elements:

READING OF LABEL TRAP RAM BY CPU

CPU reads an interface port
Initiate access to label trap RAM (RAMCPUP)
Write label trap in RAM at address PTRLAB (label trap pointer)
Restore label trap to CPU
Increment label trap pointer PTRLAB
Send acknowledge signal to CPU
Quit RAMCPUP access

WRITING OF LABEL TRAP RAM BY CPU

CPU writes an interface port
Initiate local unit access to label trap RAM (RAMCPUP)
Write label trap sent by CPU in RAM at address PTRLAB
Increment label trap pointer PTRLAB
Send acknowledge signal to CPU
Quit RAMCPUP access

| READING OF RECEIVE RAM BY CPU |
|---|
| CPU reads interface H/L port |
| Initiate RAMCPUR access (to receive RAM from local unit) |
| "Case" (present weight) of |
|   L : "Case" (previous weight) of |
|     H : If ("Flag" FIFOVIDER active) |
|       Then restore special FIFO empty code to CPU |
|       If not, read in RAM weight L of word present at address PTRLECR-0 |
|         Restore this ½ word to CPU |
|     Endif |
|     Previous weight = L |
|     Memorise FIFOVIDER flag |
|     Send acknowledge signal to CPU |
|   L : NOP |
|   Endcase |
|   H : "Case" (previous weight) of |

```
-continued
    H : NOP
    L : If (FIFOVIDER flag active)
        Then restore FIFO empty code to CPU
        If not, read in RAM weight H of word present at
        address PTRLECR-1
            Restore this ½ word to CPU
        Increment read pointer PTRLECR
        If (PTRLECR = PTRECRR)
            Then activate FIFOVIDER flag
        Endif
    Endif
    Previous weight = H
    Free FIFOVIDER flag
    Send acknowledge signal to CPU
    Endcase
Endcase
Quit RAMCPUR access
        WRITING OF RECEIVE RAM BY CPU
CPU writes interface H/L port
Initiate CPURAMR access
"Case" (present weight) of
    L : "Case" (previous weight) of
        H : If (FIFOPLEINR flag not active)
            Then write ½ word L sent by CPU in RAM at address
            PTRECRR-0
        Endif
        Previous weight = L
        Store FIFOPLEINR flag
        Send acknowledge signal to CPU
        L : NOP
    Endcase
    H : "Case" (previous weight) of
        H : NOP
        L : If (FIFOPLEINR flag not active)
            Then write ½ word H sent by CPU in RAM at address
            PTRECRR-1
            Increment write pointer PTRECRR
            If (PTRECRR = PTRLECR)
                Then activate FIFOPLEINR flag
            Endif
            If not, receive FIFO overflow
        Endif
        Previous weight = H
        Free FIFOPLEINR flag
        Send acknowledge signal to CPU
    Endcase
Endcase
Quit CPURAMR access
        READING OF SEND RAM BY CPU
CPU reads H/L port of interface channel X (X = 0/1)
Initiate RAMCPUT access
"Case" (present weight) of
    L : "Case" (previous weight on channel X) of
        H : If (FIFOVIDEXT flag of channel X active)
            Then restore special FIFO empty code in CPU
            If not, look for first occupied entry in channel X
            descriptor,
                from old read pointer PTRLECXT of channel X
            Store its address in read pointer PTRLECXT of
            channel X
                Read in RAM weight L of word present at address
                PTRLECXT-0
                Restore this ½ word to CPU
        Endif
        Previous weight on channel X = L
        Store FIFOVIDEXT flag of channel X
        Send acknowledge signal to CPU
        L : NOP
    Endcase
    H : "Case" (previous weight on channel X) of
        H : NOP
        L : If (channel X FIFOVIDEXT flag active)
            Then restore special FIFO empty code to CPU
            If not read in RAM weight H of word present at
            address PTRLECXT-1
                Restore this ½ word to CPU
                Deactivate bit No PTRLECXT in channel X
                descriptor
                If (channel X descriptor empty)
                    Then activate FIFOVEDEXT flag of channel X
                Endif
                Decrement count of words waiting in send RAM
```

```
-continued
        Endif
        Previous weight on channel X = H
        Free channel X FIFOVIDEXT flag
        Send acknowledge signal to CPU
    Endcase
Endcase
Quit RAMCPUT access
        WRITING OF SEND RAM BY CPU
CPU writes H/L port of interface channel X (X = 0/1)
Initiate CPURAMT access
"Case" (present weight) of
    L : "Case" (previous weight) of
        H : If (FIFOPLEINT flag not active)
            Then look for first empty entry in descriptors of
            both channels,
                from old write pointer PTRECRT
            Store its address in write pointer PTRECRT
            Write ½ word sent by CPU in RAM at address
            PTRECRT-0
        Endif
        Previous access = L
        Previous channel = X
        Store FIFOPLEINT flag
        Send acknowledge signal to CPU
        L : NOP
    Endcase
    H : "Case" (previous weight. previous channel) of
        H : NOP
        L./X = NOP
        L.X = If (FIFOPLEINT flag not active)
            Then write ½ word sent by CPU in RAM at address
            PTRECRT-1
            Activate bit number PTRECRT in channel X
            descriptor
            Increment count of words waiting in send RAM
            If (counter full)
                Then activate FIFOPLEINT flag
            Endif
            If not send FIFO overflow
        Endif
        Previous access = H
        Free FIFOPLEINT flag
        Send acknowledge signal to CPU
    Endcase
Endcase
Quit CPURAMT access
```

There is claimed:

1. Method of selecting digital information to be transmitted to a local unit originating from at least one independent transmission line and in the form of messages sent sequentially and organized in such a way as to comprise useful information preceded in time by selection information, the method including the following steps:

cyclical scanning at a fixed frequency of a programmed list of conditions in memory;

simultaneous acquisition of information on said transmission line;

activation of a selection process each time that the selection information of a message received on said transmission line has been acquired, the selection process including a synchronization stage which waits for the scanning process to cross the start of said list of conditions, a comparison (pattern matching) sequence on the selection information contained in the message being received, and a production of a selection variable which indicates if the message being received is of interest to said local unit or not, the selection process ending either when all the conditions from said list have been exhausted and on returning to the start of list condition or upon reading a special end of list code;

memorization of messages selected in a buffer accessible to said local unit.

2. Method according to claim 1 wherein each condition is a selection binary word comprising at least as many bits as the selection information contained in the messages, said comparison being carried out bit by bit.

3. Method according to claim 2 wherein said selection binary word comprise additional bits representing processing to be applied to the message.

4. Method according to claim 2 wherein said selection binary word comprises masks and the selection information contained in a message is regarded as coinciding with a selection word from said list of conditions if said selection information and said selection binary word differs only in respect of bits for which a mask has been defined.

5. Method according to claim 3 wherein one of said additional bits is a condition reversal bit and coincidence causes said selection variable to change to the active state if said condition reversal bit is inactive and vice versa.

6. Method according to claim 5 wherein previous activation of said selection variable is reviewed in the event of coincidence if said condition reversal bit is active.

7. Method according to claim 1 wherein the information transmitted conforms to the ARINC standard 429 and comprises a succession of words each comprising:
   a first number on eight bits (bits 0 through 7) defining a label;
   a second number (SDI) on two bits (bits 8 and 9) identifying the source or the destination of the word;
   a third number on 21 bits (bits 10 through 30) containing the data to be transmitted; and
   a parity bit (bit 31);
   the selection information comprising the first and second numbers to which is added a number assigned to a transmission line on which the word was received.

8. Device for selecting digital information to be transmitted to a local unit originating from at least one independent transmission line and in the form of messages sent sequentially and organized in such a way as to comprise the useful information preceded in time by selection information, which device comprises, interconnected by an internal bus: a receive unit connected to said transmission line by a demodulator and comprising a buffer; an interface to said local unit; a data management circuit coupled with a random access memory; a pattern matching message recognition device looking for coincidence between the selection information of the messages being received on said transmission line and label trap codes stored in an area of said random access memory, the label trap codes forming a condition list and being presented sequentially by a label trap pointer; said device further comprising a control unit connected to an address generator coupled with said random access memory through a receive pointer, and said label trap pointer, said control unit driving said address generator through said receive pointer and said label trap pointer.

9. Device according to claim 8 further comprising a send unit connected to said internal bus and to at least one transmission channel by a line modulator, said control unit being further connected to said address generator through a send pointer controlled by said control unit and driving said address generator and said random access memory.

10. Device according to claim 8 wherein at least a part of said random access memory is structured as an FIFO stack using dynamic allocation.

* * * * *